(12) United States Patent
Johnson (10) Patent No.: US 8,377,280 B2
(45) Date of Patent: Feb. 19, 2013

(54) MICROSCALE CAPACITIVE DEIONIZATION APPARATUS

(75) Inventor: Brendan Johnson, West Palm Beach, FL (US)

(73) Assignee: Vecenergy Aegir, LLC, West Palm Beach, FL (US)

( * ) Notice: Subject to any disclaimer, the term of this patent is extended or adjusted under 35 U.S.C. 154(b) by 1275 days.

(21) Appl. No.: 11/779,059

(22) Filed: Jul. 17, 2007

(65) Prior Publication Data

US 2008/0023333 A1    Jan. 31, 2008

Related U.S. Application Data

(60) Provisional application No. 60/807,581, filed on Jul. 17, 2006.

(51) Int. Cl.
*G01N 27/26* (2006.01)
*G01N 27/403* (2006.01)
*G01N 27/416* (2006.01)

(52) U.S. Cl. ........ 204/554; 204/164; 204/165; 204/660; 204/672

(58) Field of Classification Search ......... 204/544, 204/672, 554, 660, 666, 164, 165; 205/687, 205/742, 701
See application file for complete search history.

(56) References Cited

U.S. PATENT DOCUMENTS

| | | | |
|---|---|---|---|
| 2,775,640 A * | 12/1956 | Steeves | 204/666 |
| 3,849,275 A * | 11/1974 | Candor | 204/554 |
| 4,974,592 A * | 12/1990 | Branco | 204/403.06 |
| 5,061,376 A | 10/1991 | MacGregor | |
| 5,234,555 A * | 8/1993 | Ibbott | 204/554 |
| 5,425,858 A | 6/1995 | Farmer | |
| 5,718,819 A * | 2/1998 | Peschka et al. | 204/666 |
| 5,779,891 A | 7/1998 | Andelman | |
| 5,954,937 A * | 9/1999 | Farmer | 205/687 |
| 6,277,265 B1 | 8/2001 | Hanak | |
| 6,309,532 B1 | 10/2001 | Tran et al. | |
| 6,413,409 B1 | 7/2002 | Otowa et al. | |
| 6,537,799 B2 * | 3/2003 | Chow et al. | 204/164 |
| 6,565,727 B1 * | 5/2003 | Shenderov | 204/672 |
| 6,580,598 B2 * | 6/2003 | Shiue et al. | 361/502 |
| 6,783,687 B2 | 8/2004 | Richard | |
| 6,998,044 B2 | 2/2006 | Jangbarwala | |
| 7,189,578 B1 * | 3/2007 | Feng et al. | 204/164 |
| 7,223,335 B2 | 5/2007 | Dunlap | |
| 7,276,170 B2 * | 10/2007 | Oakey et al. | 204/660 |
| 7,485,214 B2 * | 2/2009 | Palmieri | 204/660 |

(Continued)

FOREIGN PATENT DOCUMENTS

WO   WO 2005015584 A2 *   2/2005

*Primary Examiner* — Keith Hendricks
*Assistant Examiner* — Colleen M Raphael
(74) *Attorney, Agent, or Firm* — McHale & Slavin, P.A.

(57) ABSTRACT

The present device is a microchannel separator that uses a separation driving force created by an electric field. An ionic fluid flows through the microchannels and is subjected to an electric field by two spaced apart parallel electrodes possessing an electric charge. The ions in the ionic fluid are attracted towards the charged electrodes and thus are concentrated in the region of flow near the charged electrodes and depleted from the central region of flow between the charged electrodes. The charged electrodes are insulated from the ionic fluid by an impermeable barrier which prevents arcing and adherence of the ions to the charged electrodes. After a sufficient length of passage of the ionic fluid through a main channel two blocking plates separate the flow into a central and two outer output channels. The central channel draws a portion of the ionic fluid from the central region of the main channel that has fewer ions than the ionic fluid in the regions near the charged electrodes. The concentrated ionic fluid in the outer channels is discharged separately from the central channel.

11 Claims, 4 Drawing Sheets

U.S. PATENT DOCUMENTS

| | | |
|---|---|---|
| 2002/0167782 A1 | 11/2002 | Andelman et al. |
| 2003/0209451 A1 | 11/2003 | Dineen et al. |
| 2005/0103634 A1 | 5/2005 | Andelman et al. |
| 2006/0049105 A1 | 3/2006 | Max |

* cited by examiner

MICROSCALE CAPACITIVE DEIONIZATION APPARATUS

CROSS REFERENCE TO RELATED APPLICATIONS

This application claims the benefit of U.S. Application No. 60/807,581, entitled Micro Capacitive Deionization Apparatus, filed on Jul. 17, 2006, the entire disclosure of which is hereby incorporated by reference.

FIELD OF THE INVENTION

The present invention relates to capacitive deionization of fluids and more particularly to flow through capacitors for removing ionic substances from an ionic fluid.

BACKGROUND OF THE INVENTION

Water contaminated with salts over 1,000 parts per million (ppm) is not fit for human consumption. In many parts of the World, the major sources of water are brackish and must be processed before they are fit for human consumption. Not only are these salty waters found in coastal areas where the major water source is seawater, but also in landlocked areas where the only available water lies deep under the surface of the Earth. Much deep-well water is full of dissolved solids, including a number of salts. The problem of brackish water in landlocked areas has many problems. Not only is it expensive to remove salt from the brackish water, there is also the problem of waste disposal from whatever system is implemented. Another facet to the problem is the ability to modify a solution to fit various sized communities depending on their fresh water needs. There is a limited amount of naturally occurring fresh water.

There are many procedures known in the art for separating ions and other dissolved solids from water but most of them require large amounts of energy and extensive knowledge to operate. Examples include distillation, reverse osmosis, ion exchange and electrodialysis. While these aspects may not be significant impediments for large-scale water supply systems, they can impose severe burdens when it comes to operating such systems for small-scale and field applications.

Capacitive deionization is another means of separating ions from an ionic fluid. This method typically encompasses two electrodes with spaced-apart end plates, one at each end of the cell, separated with an insulator layer that is interposed between each end plate and an adjacent end electrode. Each end electrode includes a single sheet of conductive material having a high specific surface area and sorption capacity, such as a carbon aerogel composite. As the ionic fluid enters the cell, it flows through a channel defined by the electrodes, substantially parallel to the surfaces of the electrodes. By polarizing the cell, ions are removed from the ionic fluid and are held in the electric double layers formed at the carbon aerogel surfaces of the electrodes. Once the cell is saturated with the removed ions, the cell is regenerated by discharging the electrodes and releasing the ions held at the electrodes. In the typical setup, the output pipe is closed with a valve prior to regeneration and the flow is redirected to an alternate waste pipe. When the electrodes are discharged, the ions are released from the electrodes and flow out through the waste pipe. Once a sufficient amount of ions are leased, the system is deemed to be regenerated. At that point, the operator can recommence the deionization process by closing the valve to the waste pipe, recharging the electrodes, and reopening the valve to the output pipe.

Through the use of microscale technology, capacitive deionization can be applied to solve both the energy problem and the large-scale system issue simultaneously. Electric fields are effective at pulling charged particles through a medium over short distances, and microtechnology allows for these small distances to be used in conjunction with electric fields to efficiently remove ions from water and produce a clean flow that can be collected for subsequent use. Since an electric field is produced by a voltage gradient, it is possible to create high voltage potentials without requiring large currents, which results in a very low power usage.

DESCRIPTION OF THE PRIOR ART

U.S. Pat. No. 5,425,858 discloses a device for removing ions from a fluid. The device employs an electrochemical cell to remove the ions. However, this device requires periodical changes in the voltage to permit cleaning of the porous material in the cell. The device employs multiple deionization and regeneration stages to accomplish desalination.

U.S. Pat. No. 5,779,891 discloses flow through capacitor for removing ions from a fluid. The device employs very low voltages on the order of 2 volts.

U.S. Pat. No. 6,277,265 discloses a device which employs the Coriolis effect of centrifugation of water to produce depleted and concentrated areas of ionic water solutions while under the influence of a constant voltage, but not a constant current, source. The electrodes used require periodic cleaning by reversing the polarity on them to discharge ions that are trapped in a double layer phenomenon.

U.S. Pat. No. 6,413,409 discloses a flow through capacitor for deionizing a fluid which utilizes loading and recovery stages (reversing polarity or short circuiting of the electrodes) to have alternating concentration outputs. The device used stacker layers of electrodes and spacers which are tightened via a retaining bolt. The device also uses voltages between 0.5 and 5 volts. The voltage is limited to 2 volts when using water to limit the electrolysis of water.

U.S. Published Patent Application No. 2005/0103634 is similar in operation to U.S. Pat. No. 5,779,891.

U.S. Published Application No. 2006/0049105 is a multi channel device which uses membrane technology to prevent the ions from touching the plates. However, this double layer results in a layer of ions which build up and then must be discharged thus preventing continuous operation of the device.

SUMMARY OF THE INVENTION

Microscale technology is a new and growing field in world of engineering applications and research. When distances between species are reduced and overall size of a reaction is conducted on a very small scale, the governing aspects of reactions change. In large scale devices, many of the aspects of the chemistry can be disregarded because their influences on the final energy balance of a reaction are extremely low. However, when the scale is reduced to a micro level, usually less than 100 microns (0.1 millimeters), previously ignored aspects of the energy balance become the governing forces of the system. As a frame of reference, a human hair is approximately 80-100 microns in diameter.

Through the use of an electric field and microchannels it is possible to separate ionized water into a concentrated brine stream and a clean stream through simple water diversion techniques. This technique requires very little energy due to the use of low currents and high voltages. It has the potential to be used in both landlocked brackish water scenarios as well as for seawater desalination. This technology can be a very low energy system, requiring at a minimum a step-up transformer to increase the voltage while simultaneously decreasing the current, which results in a very low power consumption. With the implementation of microchannels, it is easy to increase the number of individual units to create a device that can produce large quantities of potable water. Productions costs can be reduced due to the nature of the materials that are used, mostly acrylic plates and thin plastic sheets.

The primary technology used in this device is a microchannel separator that uses a separation driving force created by an electric field. An ionic fluid flows through the microchannels and is subjected to an electric field by two spaced apart parallel plates possessing an electric charge. The ions in the ionic fluid are attracted towards the charged plates and thus are concentrated in the region of flow near the charged plates and depleted from the central region of flow between the plates. The charged plates are insulated from the ionic fluid by an impermeable barrier which prevents arcing and adherence of the ions to the charged plates. After a sufficient length of passage of the ionic fluid through a main channel, two blocking plates separate the flow into a central and two outer output channels. The central channel draws a portion of the ionic fluid from the central region of the main channel that has fewer ions than the ionic fluid in the regions near the charged plates. The ionic fluid in the outer channels is discharged separately from the central channel. It is important that the microchannels not be too large or the percent of ions removed will decrease. In such cases, additional passes through similar devices will be requires to achieve the desired level of ion removal. In order to be feasible, the device's microchannels need to be very small, on the order of 100 microns or less in width.

Extensive testing has shown that in the desalination process, a single microscale unit can remove up to four percent of the dissolved ions in a solution after one pass through the device, leaving a more concentrated brine as a wastewater product. If smaller channels are employed or more units are used together in parallel it becomes possible to increase clean water production while at the same time removing a higher percentage of ions or total dissolved solids with each pass through the device. Units can also be used in series to increase removal of ions from the water.

A significant advantage of microscale technology is its flexibility in production size. Depending on the job requirements, the number of units employed can be varied to meet the flow rate or load the device needs to operate optimally. Another advantage is that the present invention can be operated constantly without the need for regeneration, allowing continuous flow operation. This is particularly beneficial for applications where skilled or attentive operators are not available or when an uninterrupted supply of the deionized water is required. An example would be a military field unit used to render brackish water into a more potable form. In such cases, the present invention could be used to produce a potable water output and a waste output that could be used for applications where the ion concentration is less critical (e.g. washing clothes). It is also possible to implement this design to any industrial application that needs to remove ionized species from a production fluid flow. The design need not be limited to only brackish water treatment, it can also remove any charged species from water with a charged plate and a continuous flow design. The present invention can be used to provide potable water for drinking and washing. It can be used as a pre-step treatment for desalination by reverse osmosis; for the removal of contaminants, such as arsenic or rust, from fluids; for the removal of ions from blood as in blood dialysis; for the removal of ion contaminants from polar and non polar fluids. In addition, the present invention could be used in circumstances where it is desired to concentrate ions in part of an ionic fluid stream. The flow through nature of the device, in conjunction with the insulated electrodes, has the additional advantages that the electrodes are not subject to fouling and thus require little or no maintenance. In addition, another advantage of the present invention dispenses with the need to regenerate the electrodes and thus reduces the possibility of inadvertent cross contamination caused by operator error.

Waste disposal from the present invention, when necessary, can be dealt with the same manner as with other desalination techniques. Possible solutions include evaporation of the brine, dumping of waste fluid or deep well injection techniques. The safety aspects of this device are limited only to the types of contaminated water or fluid that are passed through the device. With proper design of the circuits and power supplies there should be little chance of electrical shocks when the device is used correctly.

Accordingly, it is an objective of the instant invention to provide a device to remove ions from a fluid utilizing electromagnetic forces created by charged plates electrically insulated from the fluid.

It is a further objective of the instant invention to provide a device to remove ions from a fluid utilizing a continuous flow system.

It is yet another objective of the instant invention to provide a device to remove ions from a fluid which does not require regeneration or cleaning of the charged plates.

It is a still further objective of the invention to provide a device to remove ions from a fluid which does not require a phase change of the fluid, e.g. distillation.

It is a still further objective of the invention to provide a device to remove ions from a fluid which does not require a semi-permeable barrier like reverse osmosis.

It is still yet another objective of the invention to provide a device which is extremely small and a large number of individual units occupying a relatively small space, thus enabling ease of portability and small units used in a matrix of parallel and series for industrial production levels in a small unit.

It is still yet another objective of the invention to provide a device which operates at voltages substantially higher than those of the prior art.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

NUMBERS IN THE DRAWINGS

10. Device
12. Main channel
14. Positive Charge Electrode

16. Negative Charge Electrode
18. Nonconductive, impermeable barrier
20. Nonconductive, impermeable barrier
22. Blocking plate
24. Blocking plate
26. Concentrated ion fluid stream
28. Concentrated ion fluid stream
30. Deionized fluid stream
32. End cap
34. Fluid inlet port
36. Concentrated ion outlet port
38. Deionized fluid outlet port
40. Power port
42. End cap
44. Concentrated ion fluid plate
46. Concentrated ion fluid plate
48. Concentrated ion fluid cutout
50. Concentrated ion fluid cutout
52. Blocking plate cutout
54. Blocking plate cutout
56. Deionized fluid plate
58. Deionized fluid cutout
60. Concentrated ion fluid output channel
62. Concentrated ion fluid output channel
64. Deionized fluid output channel

DETAILED DESCRIPTION OF THE INVENTION

While the present invention is susceptible of embodiment in various forms, there is shown in the drawings and will hereinafter be described a presently preferred, albeit non limiting, embodiment with the understanding that the present disclosure is to be considered an exemplification of the present invention and is not intended to limit the invention to the specific embodiments illustrated. Also, it is understood that the present invention is capable of removing ions from various fluids, in addition to water.

Figure 1:
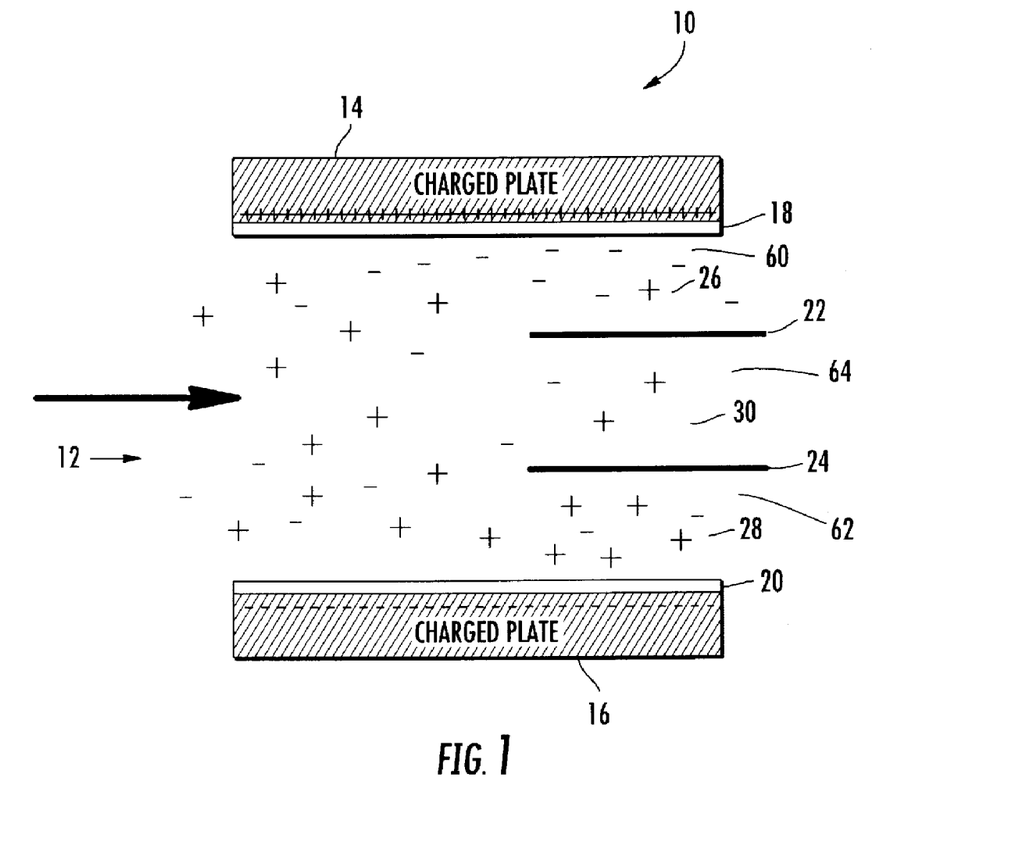
FIG. 1 is a schematic representation of the flow of the fluid through the unit with ions present.

The basis operation of the present invention is illustrated in FIG. 1. The fluid or ionic fluid to be deionized is fed in the device 10 and flows down the main channel 12. The fluid stream passes between charged electrodes 14 and 16. The positive charged electrode 14 has a positive charge and attracts negative ions toward the upper portion of the fluid stream. The negative charge electrode 16 has a negative charge and attracts positive ions toward the lower portion of the fluid stream. The charged electrodes are supplied with a potential in the range of 10 to 10,000 volts, preferably 2500 to 10,000 volts. This creates an electric field which induces the migration of the ions. The charged electrodes 14, 16 are separated from the fluid stream by nonconductive, impermeable barriers 18, 20 which insulate the electrodes 14, 16 from the fluid, preventing arcing, and protect the electrodes 14, 16 from fouling by the ions.

After the fluid flows a sufficient distance to produce the desired amount of electromagnetic attraction of the ions towards the respective charged electrodes, the flow is separated by blocking barriers 22, 24 into three streams. Two of the streams 26, 28 are adjacent the charged electrodes 14, 16. These streams contain an enhanced concentration of ions due to their attraction by the charged electrodes. The third stream 30 in the center contains a reduced concentration of ions. The streams are then discharged from the device. Concentrated ion fluid streams 26, 28 are considered to be the waste streams and the center deionized fluid stream 30 is the desired product or deionized fluid. In the case of water desalination, the concentrated ion fluid streams 26, 28 contain higher levels of brine or salt while the center deionized fluid stream 30 contains the potable water. Nonconductive barriers 18, 20, blocking barriers 22, 24 form concentrated ion fluid channels 60, 62 and deionized fluid channel 64. Concentrated ion fluid streams 26, 28 flow through concentrated ion fluid channels 60, 62. Deionized fluid stream 30 flows through deionized fluid channel 64.

Figure 2:
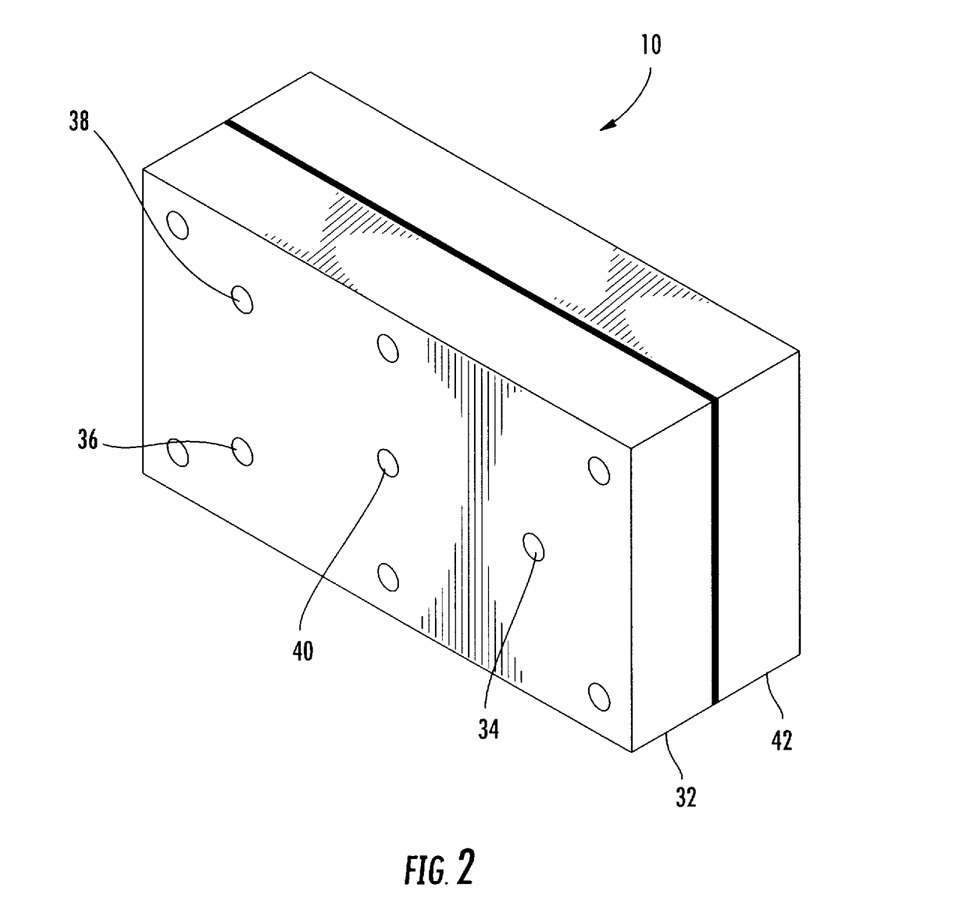
FIG. 2 is a perspective view of a single unit.

FIG. 2 illustrates the exterior of a unit of the device including inlet and outlet ports. The ionic fluid or salt water is introduced into the device at inlet 34 of end cap 32. The fluid flows through the device where the ions are separated from the fluid. The streams containing the concentrated ions 26, 28 can be combined and flow out of the device through outlet 36. The streams containing the concentrated ions can also be discharged from the device through separate outlets. The stream 30 containing the desired product, e.g. the potable water, is discharged from the device through outlet 38. The power to the charged electrodes is supplied through port 40. While only one end cap is illustrated containing the inlet, outlets and power port another identical end cap 42 can be provided at the opposite side of the device. End cap 42 can also be provided with an ionic fluid or salt water inlet, concentrated ion fluid outlets, desired product outlet and a power port.

The ports can be configured to facilitate placement of multiple units in a single large bank of units. Having one unit sit adjacent another unit with the appropriate ports in alignment can facilitate the processing of large amounts of ionic fluid or water from a series installed in a compact space.

Figure 3:
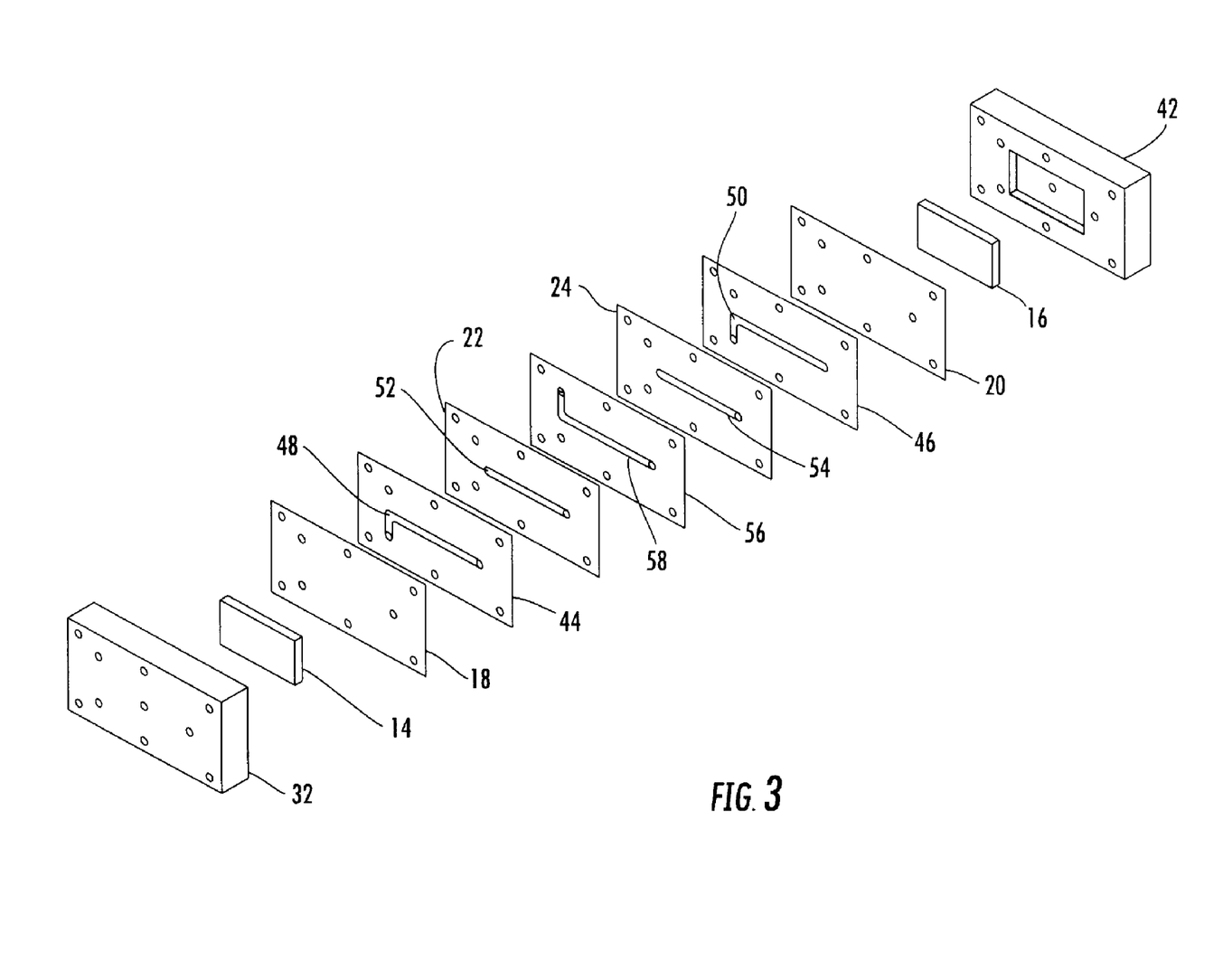
FIG. 3 is an exploded perspective view of a single unit.

FIG. 3 illustrates the plates or sheets which comprise the device. A preferred embodiment comprises sheets of plastic. The end caps are provided with a recess which contains the charged electrodes 14, 16. Adjacent the end caps are the nonconductive, impermeable barriers 18, 20. Adjacent the nonconductive barriers 18, 20 are waste plates 44, 46 containing deionized fluid channels 48, 50 through which the concentrated ion streams 26, 28 flow. The waste plates are etched to form the concentrated ion streams. Any other suitable means can be employed to form the concentrated ion streams by those skilled in the art. Adjacent the waste plates 44, 46 are the blocking plates 22, 24 which contain blocking plate cutouts 52, 54. The length of the blocking plate cutouts 52, 54 are shorter than the concentrated ion fluid cutouts 48, 50 thus separating the main stream into three separate streams 26, 28 and 30. Blocking plate cutouts 52, 54 can be etched into the blocking plates or formed by any other suitable means. In the center is the output plate 56 containing the desired output deionized fluid stream 30. A deionized fluid cutout 58 is formed in by etching or any other suitable means. The length of deionized fluid cutout 58 is the same as concentrated ion fluid cutout 48 and 50.

Concentrated ion fluid cutouts 48 and 50 are formed with a substantially 90 degree bend or elbow at their ends and are connected to output 36. DEionized fluid cutout 58 is formed with a substantially 90 degree bend or elbow at its end and connected to output 38. The bend in deionized fluid cutout 58 is in the opposite direction as the bends in concentrated ion fluid cutouts 48 and 50. In place of the 90 degree bends, the cutouts 48, 50 and 58 could be diverted from the main stream in different directions and connected to outputs 36 and 38 respectively.

The preferred embodiment has an overall distance from charged electrode to charged electrode of 50 to 1000 microns, preferably 700 microns (0.7 millimeters). Each plate is 10 to 200 microns thick, preferably 100 microns. The channels are 50 to 700 microns, preferably 500 microns in depth or in height as illustrated in FIG. 3. They are also preferably 1500 microns wide. If the channels were less than 100 microns in depth, greater separation would be seen due to the nature of the electric field degradation over short distances.

As illustrated in FIG. 2 the compact design of a single unit can be seen. The thick end caps are made of acrylic while the dark line between them represents the series of plates formed of transparency sheets. The length of a single unit of the preferred embodiment is 7.5 centimeters with a width of 4 centimeters a height of 3 centimeters. While this is a preferred embodiment any other dimensions are also possible.

The preferred embodiment produced a fairly consistent removal of approximately 3 percent on the ions after a number of runs with different procedures. A single unit produces approximately 50 ml/hr of the clean or desired product stream, at 2500 volts. The power supply draws 750 watts (0.75 kilowatts) while is running at maximum draw. This results in only 0.75 kilowatts per hour per power supply or 0.75 kwh. Any number of individual units could be operated off the same current draw as long as they are wired in parallel with each other. Grouping of the units together requires a small amount of labor and additional parts. The units generate a small amount of heat and/or noise so no extra materials are needed for construction.

The easiest and least expensive method of manufacturing these units is to etch or cutout them into a thin film. Commercially available transparency sheets are suitable because of their availability and relatively low cost. The transparency sheets are easy to machine using a template made out of sheet metal and through the use of a punch and blade to cut the plastic layers. Each sheet is approximately 100 microns thick. The sheets are stacked on top of each other creating a microchannel system that has the flow channels for the deionized and waste streams. Acrylic plates are employed to sandwich the transparency sheets to prevent leaking and to provide supports for hose fittings.

Figure 4:
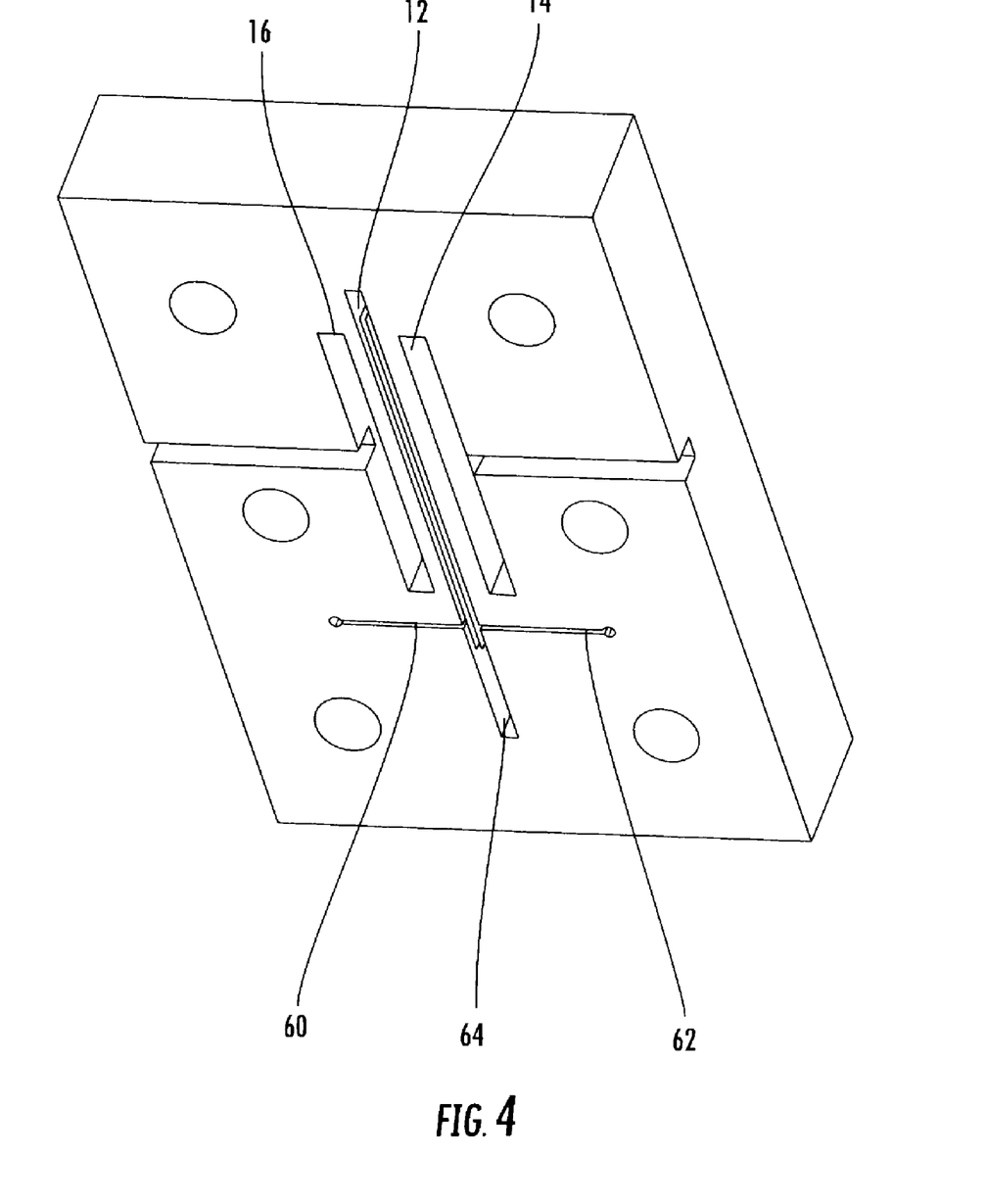
FIG. 4 is a perspective view of another embodiment of the device made of substantially a single piece of material.

FIG. 4 illustrates an embodiment wherein the unit is formed from a single piece of material. The main channel 12 is separated into three fluid streams 26, 28 and 30 by a plurality of channels etched into a single piece of material. The concentrated ion streams flow through channels and separated by electrodes 14, 16 to produce concentrated ion fluid channels 60, 62 and deionized fluid channel 64. A plurality of these could be formed into a single piece of material by etching or other means. A plurality of these pieces could be connected together to a large deionization device.

It should be noted that those of ordinary skill in the art will recognize that the foregoing descriptions cover certain preferred embodiments of the present invention. Various modifications can be made to the particular embodiments described without departing from the spirit and scope of the invention. All such changed and modifications are incorporated within the scope of the following claims. For example, the invention could be fabricated so that an individual unit had about 100 microns as the height for the main flow channel with each of the outlet flow channels being approximately 20-40 microns tall and blocking plates of approximately 10 microns in thickness. Similarly, the channels could be cut into a sheet of acrylic and copper or some other conductor forming the charged plates could be embedded into the acrylic sheets on either side of the microchannels. Utilizing this design, it is possible to have 1000 channels or more in a one foot by one foot piece of quarter inch acrylic. By combining large numbers of these plates, it would relatively simple to construct a refrigerator sized unit that could handle relatively large quantities of fluid, water or ionic fluid. Pumps could be integrated into a design that could pull water from a source and run it through the device. Storage tanks utilizing gravity pressure could be integrated into a design. Recycle streams could be completely contained within the device in order to assure that outflow contents are within the standards for water treatment.

All patents and publications mentioned in this specification are indicative of the levels of those skilled in the art to which the invention pertains. All patents and publications, included but not limited to U.S. Pat. Nos. 5,425,858; 5,779,891; 6,277,265; 6,413,409; U.S. Published Application No. 2005/0103634 and U.S. Published Application No. 2006/0049105 are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A deionizing apparatus for fluids comprising:
an inlet constructed and arranged for passage of a flowing stream of a fluid mixed with ions into a main channel, said main channel having a width defined by two side walls and a height defined by a top and a bottom wall wherein said main channel is a microchannel, said top and said bottom walls being constructed from non-magnetic material;
a first positively charged electrode positioned along a first of said two side walls;
a first impermeable barrier positioned between said first electrode and said fluid mixed with ions;
said first electrode constructed and arranged to attract negatively charged ions to a position adjacent said first impermeable barrier, said negatively charged ions flowing with said stream of fluid adjacent said first impermeable barrier;
a first blocking plate positioned substantially parallel and spaced away from said first side wall and said first impermeable barrier, said first blocking plate having a first end surface positioned at an intermediate portion of said main channel and extending to an end portion of said main channel, said area between said first blocking plate and said first side wall defining a first output channel;
a second negatively charged electrode positioned along a second of said two side walls, said first and said second electrodes being separated by a distance not greater than 700 microns;
a second impermeable barrier positioned between said second electrode and said fluid mixed with ions;

said second electrode constructed and arranged to attract positively charged ions to a position adjacent said second impermeable membrane barrier, said positively charged ions flowing with said stream of fluid adjacent said second impermeable membrane barrier;

a second blocking plate positioned substantially parallel and spaced away from said second side wall and said second impermeable membrane barrier, said second blocking plate having a first end surface positioned at an intermediate portion of said main channel and extending to an end portion of said main channel, said area between said second blocking plate and said second side wall defining a second output channel;

an area between said first blocking plate and said second blocking plate defining a third output channel, said first and said second blocking plates dividing said flowing stream of fluid into three flowing streams of fluid, whereby a first of said streams of fluid flowing through said first channel includes a high concentration of negatively charged ions, whereby a second of said streams flowing through said second channel includes a high concentration of positively charged ions and wherein a third of streams of fluid flowing through said third channel is substantially devoid of ions.

2. The apparatus of claim 1 including a device for providing at least 500 volts to said first and said second electrodes.

3. The apparatus of claim 1 including a device for providing at least 2500 volts to said first and said second electrodes.

4. The apparatus of claim 1 wherein a plurality of individual deionizing apparatus are connected to each other in a parallel relationship.

5. The apparatus of claim 4 wherein said plurality of individual deionizing apparatus connected in said parallel relationship are connected to each other in a series relationship.

6. The apparatus of claim 1 wherein a plurality of individual deionizing apparatus are connected to each other in a series relationship.

7. A method for deionizing fluids comprising:

providing an inlet constructed and arranged for passage of a flowing stream of a fluid mixed with ions into a main channel, said main channel having a width defined by two side walls and a height defined by a top and a bottom wall wherein said main channel is a microchannel, said first and said second electrodes being separated by a distance not greater than 700 microns;

providing a first positively charged electrode positioned along a first of said two side walls; providing a first impermeable barrier positioned between said first electrode and said fluid mixed with ions;

applying power to said first electrode to attract negatively charged ions to a position adjacent said first impermeable membrane barrier, said negatively charged ions flowing with said stream of fluid adjacent said first impermeable membrane barrier;

providing a first blocking plate positioned substantially parallel and spaced away from said first side wall and said first impermeable membrane barrier, said first blocking plate having a first end surface positioned at an intermediate portion of said main channel and extending to an end portion of said main channel, said area between said first blocking plate and said first side wall defining a first output channel;

providing a second negatively charged electrode positioned along a second of said two side walls, said first and said second electrodes being separated by a distance not greater than 700 microns;

providing a second impermeable barrier positioned between said second electrode and said fluid mixed with ions;

applying power to said second electrode to attract positively charged ions to a position adjacent said second impermeable membrane barrier, said positively charged ions flowing with said stream of fluid adjacent said second impermeable membrane barrier;

providing a second blocking plate positioned substantially parallel and spaced away from said second side wall and said second impermeable membrane barrier, said second blocking plate having a first end surface positioned at an intermediate portion of said main channel and extending to an end portion of said main channel, said area between said second blocking plate and said second side wall defining a second output channel;

providing an area between said first blocking plate and said second blocking plate defining a third output channel, said first and said second blocking plates dividing said flowing stream of fluid into three flowing streams of fluid, whereby a first of said streams of fluid flowing through said first channel includes a high concentration of negatively charged ions, whereby a second of said streams flowing through said second channel includes a high concentration of positively charged ions and wherein a third of said streams of fluid flowing through said third channel is substantially devoid of ions.

8. The method of claim 7 including the step of connecting a plurality of individual deionizing apparatus in a parallel relationship.

9. The method of claim 7 including the step of connecting a plurality of individual deionizing apparatus connected in a series relationship.

10. The method of claim 7 wherein said fluid is water.

11. The method of claim 7 wherein said fluid is blood.

* * * * *